United States Patent
Sulc (10) Patent No.: US 9,615,308 B2
(45) Date of Patent: Apr. 4, 2017

(54) SYSTEM FOR MESSAGE ACKNOWLEDGEMENT AND DATA COLLECTION IN WIRELESS MESH NETWORKS

(71) Applicant: Vladimir Sulc, Sobotka (CZ)

(72) Inventor: Vladimir Sulc, Sobotka (CZ)

(73) Assignee: MICRORISC s.r.o., Jicin (CZ)

(*) Notice: Subject to any disclaimer, the term of this patent is extended or adjusted under 35 U.S.C. 154(b) by 115 days.

(21) Appl. No.: 14/463,365

(22) Filed: Aug. 19, 2014

(65) Prior Publication Data

US 2015/0055498 A1  Feb. 26, 2015

(30) Foreign Application Priority Data

Aug. 26, 2013 (CZ) .................. CZ2013-651

(51) Int. Cl.
- *H04W 40/20* (2009.01)
- *H04L 12/721* (2013.01)
- *H04L 12/733* (2013.01)

(52) U.S. Cl.
CPC ........... *H04W 40/20* (2013.01); *H04L 45/122* (2013.01); *H04L 45/32* (2013.01)

(58) Field of Classification Search
CPC ....... H04W 40/20; H04L 45/122; H04L 45/32
USPC ........................ 370/256, 315, 400
See application file for complete search history.

(56) References Cited

U.S. PATENT DOCUMENTS

| | | |
|---|---|---|
| 4,905,234 A | 2/1990 | Childress et al. |
| 5,471,471 A | 11/1995 | Freeburg et al. |
| 5,602,843 A * | 2/1997 | Gray ............... H04W 84/16 370/338 |
| 5,815,732 A | 9/1998 | Cooper et al. |
| 5,842,124 A | 11/1998 | Kenagy et al. |

(Continued)

FOREIGN PATENT DOCUMENTS

CZ  2008-288 A3  11/2009

OTHER PUBLICATIONS

Sulc et al., "IQMESH, Technology for Wireless Mesh Networks: Implementation Case Studies", ICNS 2012, Published on Mar. 25, 2012.*

(Continued)

*Primary Examiner* — Alex Skripnikov
(74) *Attorney, Agent, or Firm* — Patent GC LLC (57) ABSTRACT

A slave communication device includes a memory and a processor for operation within a wireless mesh network of communication devices including a control communication device. The memory stores a virtual routing identifier assigned to the slave communication device in response to increasing range from the control communication device. The processor, in response to receiving an initiation message from a control communication device, initiates data collection from said slave communication device synchronized relative to the start of the initiation message frame by, cumulatively setting bits in a first acknowledgement message in response to content of a second acknowledgement message received from another slave communication device. The first acknowledgement message being synchronized with start of the initiation message frame and the processor initiates communication of the first acknowledgement message to a destination in a time slot selected in response to the assigned virtual routing identifier.

20 Claims, 4 Drawing Sheets

(56) References Cited

U.S. PATENT DOCUMENTS

| | | | |
|---|---|---|---|
| 7,304,587 B2* | 12/2007 | Boaz | H04Q 9/00 340/870.02 |
| 9,179,498 B2* | 11/2015 | Sulc | H04L 61/35 |
| 2003/0109218 A1 | 6/2003 | Pourkeramati et al. | |
| 2003/0204560 A1 | 10/2003 | Chen et al. | |
| 2004/0085965 A1 | 5/2004 | Fotedar | |
| 2004/0167708 A1 | 8/2004 | Jenkins et al. | |
| 2004/0215752 A1 | 10/2004 | Satapati et al. | |
| 2005/0025179 A1 | 2/2005 | McLaggan et al. | |
| 2006/0165015 A1 | 7/2006 | Melick et al. | |
| 2007/0004344 A1 | 1/2007 | DeGroot et al. | |
| 2007/0188343 A1 | 8/2007 | Sulc | |
| 2007/0268127 A1* | 11/2007 | Rittle | G08B 25/10 340/539.22 |
| 2008/0273542 A1 | 11/2008 | Hagiwara et al. | |
| 2008/0285601 A1 | 11/2008 | Sherrer et al. | |
| 2010/0002700 A1 | 1/2010 | Simpson, Jr. | |
| 2012/0008542 A1* | 1/2012 | Koleszar | H04L 45/32 370/312 |
| 2012/0163234 A1* | 6/2012 | Sulc | H04L 61/35 370/254 |
| 2012/0209951 A1* | 8/2012 | Enns | H04L 29/08729 709/217 |

OTHER PUBLICATIONS

Lee SH., Lee KW., Cho YZ. "Directional Flooding Scheme with Data Aggregation for Energy-Efficient Wireless Sensor Networks" (2008) In: VazãT., Freire M.M., Chong I. (eds) Information Networking. Towards Ubiquitous Networking and Services. ICOIN 2007. Lecture Notes in Computer Science, vol. 5200. Springer, Berlin, Heidelberg.*

Fei Hu, Xiaojun Cao, Carter May "Optimized Scheduling for Data Aggregation in Wireless Sensor Networks" (Apr. 2005), IEEE International Conference on Networking, Sensing and Control.*

* cited by examiner

| | | | Acknowledgement frame | | | | | | | | | | | | | | | | | | |
|---|---|---|---|---|---|---|---|---|---|---|---|---|---|---|---|---|---|---|---|---|---|
| | | | data in the individual devices after receiving transmission of the active device | | | | | | | | | | | | | | | | | | |
| | | | data in N1 | | | | data in N2 | | | | data in N3 | | | | data in N4 | | | | data in N5 | | | |
| | | | 1 | 0 | 0 | 0 | 0 | 2 | 3 | 0 | 0 | 0 | 3 | 0 | 0 | 0 | 3 | 4 | 0 | 0 | 0 | 0 | 5 |
| | | | 1 | 0 | 0 | 0 | 0 | 2 | 3 | 0 | 0 | 0 | 3 | 0 | 0 | 2 | 3 | 4 | 0 | 0 | 2 | 3 | 0 | 5 |
| | | | 1 | 2 | 3 | 4 | 0 | 2 | 3 | 0 | 0 | 0 | 3 | 0 | 0 | 2 | 3 | 4 | 0 | 0 | 2 | 3 | 4 | 5 |
| | | | 1 | 2 | 3 | 4 | 0 | 2 | 3 | 0 | 0 | 0 | 3 | 0 | 0 | 2 | 3 | 4 | 0 | 0 | 2 | 3 | 4 | 5 |
| | | | 1 | 2 | 3 | 4 | 0 | 2 | 3 | 0 | 0 | 0 | 3 | 0 | 0 | 2 | 3 | 4 | 0 | 0 | 2 | 3 | 4 | 5 |

SYSTEM FOR MESSAGE ACKNOWLEDGEMENT AND DATA COLLECTION IN WIRELESS MESH NETWORKS

FIELD

A system concerns message acknowledgement and/or data collection from communication devices with packet message transmission in arranged wireless mesh networks and supporting creation of a generic platform.

BACKGROUND

In mesh networks with packet transmission and created routing structure utilising directional flooding, messages are sent in smaller parts called packets. Packets contain information about their recipient and are transmitted in general mesh networks from the sender to a sequence of devices until they reach the recipient. Defining the path, i.e. deciding which devices the packets will be transmitted through, is called routing. The goal of routing is to ensure the most reliable and fastest possible delivery of the packet from the sender to the recipient. Mesh networks represent a general network topology, where connections may exist between any two devices in the network, which means that these devices may mutually communicate and transfer messages. A mesh network where a connection can be established between any two devices in the network is called a fully connected mesh network, however in practice the more common case is that some devices may establish mutual connections.

A mesh network and routing may be thought of as a network of cities interconnected by a road network, and routing as a journey of a vehicle with its cargo (a packet) from the city of a sender to a recipient. The vehicle travels from one city to another utilising the existing road network. Individual roads connecting cities represent connections between them. A journey from a starting point to an endpoint is thus divided into individual roads, which are connections in the context of general networks. There exist many different routes which the vehicle can use to transport the cargo from the city of the sender to the city of the recipient, and similarly in wireless real-world mesh networks there can exist many different routes for routing a packet from a sender to a recipient. Since general mesh networks may or may not contain a connection between any pair of devices, the number of total possible connections in a network with n devices is lower or equal to $\underline{N}_{max}$ where $\underline{N}_{max}=n*(n-1)/2$. In the specific example with cities, this is the maximum number of roads in the road network between n cities.

In wireless mesh networks, devices communicate wirelessly, via radio waves. Connections between two communicating devices are thus usually limited by the range of these devices. Devices which are too far from each other cannot establish a mutual connection. Since the distances between individual devices are not usually known in advance in general wireless mesh networks, it is not clear in advance which devices may establish mutual connections, and thus routing, i.e. finding the route between the sender device to the recipient device of the packet, is a relatively difficult algorithmic problem, especially due to the number of possible routes and combinations of various connections. Various routing methods for communication in mesh networks are used in practice. These include, for instance, routing based on routing tables, often used in computer technology, flooding or random routing. Routing based on sharing and distribution of routing tables or vectors is one of the most optimal methods with respect to the efficiency of packet delivery, however this comes at the cost of substantial memory requirement of a control processor or microcontroller of communication devices, especially in large networks with many devices. Flooding an unordered network, based on distributing a packet gradually into the whole network is a solution suitable for the reliable delivery of the packet, however this is far from optimal due to the specific properties of wireless networks, which generally have low data transfer speeds and problems with media sharing (conflicts in media access and their resolution). In the example above, this approach involves traversing the whole road network in a vehicle. Random routing is used in computer technology, e.g. when the router is overloaded and may reduce packet loss, but is not suitable for wireless mesh networks for telemetry due to its low reliability.

In connected systems individual devices may have dedicated connections between them, however, wireless mesh networks share a communication spectrum. Inappropriate use of the communication spectrum and non-adherence to communication rules leads to collisions on individual communication connections, preventing efficient communication. In the road work example, this would be analogous to chaos and collisions leading to closure of many roads resulting from vehicles failing to follow rules such as which side of the road to use and which vehicle takes precedence. Various methods to prevent collision states are thus used for communication in wireless networks. The most frequently used methods involve defining rules on WHEN each device may transmit (so-called Time Division Multiplexing or Time Division Multiple Access—TDMA) and also WHERE each device may transmit, i.e. which frequencies (usually specified by a channel) may be used by each communication device. Other techniques for media/spectrum access are also used in practice. CSMA, CDMA, TDMA and TMPS are only a few examples.

TDMA is often used in practice to prevent transmission collisions due to its easy implementation and reliability. TDMA is based on the fact that in a given time interval, called a time slot, only a single specified device may transmit. A group of time slots belonging to different participants is called a frame. On our road network example, the easiest way of illustrating this approach is using traffic lights, which limit traffic on shared crossroads in time-defined intervals. Since most RF circuits today allow receiving and sending on several frequencies, many systems also utilise frequency hopping (FHSS—Frequency Hopping Spread Spectrum), where either individual bits or, more commonly, groups of bits are transmitted on different frequencies. In practice this means that they may be transmitted simultaneously, since they do not interfere with each other. This manner of communication may be illustrated in our example as having multi-lane roads between cities, where several vehicles may drive on a single road simultaneously.

As previously mentioned, a general mesh network with n communication devices allows at most $\underline{N}_{max}$ connections between communication devices, where $\underline{N}_{max}=n*(n-1)/2$, with n being the number of communication devices in the network. Since the topology of a general wireless mesh network is not known in advance, the limit case of applying collision-free flooding via TDMA would require dedicating up to $\underline{N}_{max}$ time slots for individual routings to ensure reliable delivery of the packet. However, this is time-inefficient. For instance, for a commonly used speed of 19.2 kbps, the transmission of a single short packet with 24 B of data in a network with 100 communication devices would result in a frame of up to 50 seconds.

Creation of a functional layout of the wireless network using packet transmission and comprising tens, hundreds or thousands of devices is a difficult algorithmic process due to the gigantic amount of various layouts of such a network. This is further complicated for networks comprising communication devices with limited hardware resources (program and data memory) and communicating at low speeds, especially in the case of multiple-routing, i.e. the transfer of messages from one device to another. One system addresses the problem by creation of a functional arrangement of a generic wireless mesh network and routing in the network as described in US Patent Application 2012/0163234 filed Jun. 28, 2012, and ensures reliable and efficient delivery of messages. However, as the number of devices connected to the network grows, so grows the response time when communication with several devices is required, e.g. in case of request for acknowledgement of messages intended for a group of devices or all devices.

Wireless mesh networks are becoming increasingly popular for telemetry and automation as well as for many other applications. The areas of telemetric Automated Meter Reading (AMR), control of public lighting (Street Lighting) or distribution monitoring are good examples. These cases deploy networks with hundreds or thousands of devices and speed of data collection from the individual devices or acknowledgement of the individual devices to a superior system are therefore an important technical parameter in networks with slow transfer speeds.

SUMMARY

A system communicates in mesh networks using packet transmission and with a created routing structure utilising directional flooding and message acknowledgement and data collection in arranged wireless mesh networks. In an embodiment, a service is incorporated in devices providing direct addressing in wireless networks supporting a generic platform. Further, in an embodiment, routing is based on using a time multiplex. The system quickly and effectively performs bulk collection of data from communication devices in wireless mesh networks and accelerates acknowledgement of group or bulk messages in these networks. The system collects and acknowledges data from communication devices in wireless mesh networks with packet message transmission for telemetry, automation and other applications, where a mesh network includes at least one control communication device and a set of slave communication devices.

A control communication device is used for searching through the mesh network so that individual slave communication devices that are discovered are assigned a unique virtual routing number in the network with the number being stored into memory in the device. The number represents the distance of the slave communication device from the control communication device determined by the number of routings. In a network arranged in such a way, message control packets are transferred from the network control communication device to addressed slave communication devices and back using directional flooding.

Individual addressed slave communication devices, after reception of an initiation message frame from a control communication device, through which the control communication device initiates data collection from the slave communication devices that are time-synchronised relative to the beginning of the initiation frame, a bit or a number of bits are set, which gradually merge with acknowledgement collective messages received from other addressed slave communication devices during an acknowledgement frame that is time-synchronised to the initiation frame. The merged acknowledgement collective messages are gradually sent by the slave communication devices in the corresponding time slot of the acknowledgement frame from the highest virtual routing number towards the control communication device.

In individual addressed slave communication devices, which are time-synchronised relative to the beginning of the initiation frame, due to reception of the initiation message from the control communication device, and after processing of routing of the initiation frame, if a device is intended for routing, a bit or a number of bits are set, and gradually are merged with acknowledgement collective messages received from other slave communication devices during the acknowledgement frame that is time-synchronised to the initiation frame, and they are subsequently sent in this merged form by these slave communication devices in the corresponding time slot of this acknowledgement frame, from the slave communication devices with the highest virtual routing number towards the control communication device. The gradual merging of received collective messages described above and sending of aggregated data advantageously ensures that after reception and merging of messages delivered within the acknowledgement frame, the control device obtains inserted data from the slave communication devices.

In the initiation message frame from the control communication device, routed to slave communication devices, may be included additional information and in individual addressed slave communication devices this information is interpreted and a required sequence of instructions is performed in response to this interpretation and independently from it or based on its result, one or several bits are set, which are inserted into the collective acknowledgement message addressed to the control communication device. Timing of the acknowledgement frame, i.e. for example delay of the acknowledgement frame or length of the individual time slots within it, can be set in a similar way, i.e. based on additional information inserted into the initiation message from the control communication device.

After reception of the initiation message, time-synchronised relative to the beginning of the frame, individual addressed slave network communication devices first perform the required sequence of instructions in response to interpretation of the additional information inserted into the initiation message by the control device, and independently of it, or based on its result, sets one or several bits, whereas these bits are inserted within the collective acknowledgement message addressed to the control network device.

The system advantageously makes bulk acknowledgement and/or data collection accessible in wireless mesh networks, and is implementable as a directly addressable virtual peripheral in wireless networks so that such a peripheral is served based on interpretation of messages sent to slave communication devices in the wireless network.

The system advantageously provides bulk data and response aggregation from network communication devices as a directly addressable service in wireless networks (as described in Czech Patent document CZ2008-288). The system advantageously improves known peripheral and service functions accessible in a wireless network using a directly addressable service. In response to reception of an initiation message frame, addressed slave network communication devices are time-synchronised relative to the beginning of the frame. Slave network communication devices interpret such an initiation message as a command for a virtual peripheral (service) providing additional information, and performs a required sequence of instructions and, independently of it or based on its result, sets one or several bits. These bits are inserted by a device into a collective acknowledgement message addressed to the control network communication device. The system comprises a virtual peripheral for providing network services and may be used, e.g. for data collection or network management and substantially enhances networking capability and enables creation of a generic platform with the devices.

In an embodiment, a slave communication device includes a memory and a processor for operation within a wireless mesh network of communication devices including a control communication device. The memory stores a virtual routing identifier assigned to the slave communication device in response to increasing range from the control communication device. The processor, in response to receiving an initiation message from a control communication device, initiates data collection from the slave communication device synchronised relative to the start of the initiation message frame by, cumulatively setting bits in a first acknowledgement message in response to content of a second acknowledgement message received from another slave communication device. The first acknowledgement message being synchronized with start of the initiation message frame and the processor initiates communication of the first acknowledgement message to a destination in a time slot selected in response to the assigned virtual routing identifier.

DETAILED DESCRIPTION

Definitions

Initiation message comprises a prompt message sent by a control communication device to a network. The initiation message is sent in the form of a broadcast (i.e. message addressing substantially all devices in the network) or as a group message (i.e. message addressing a group of devices in the network). By sending the initiation message, the control communication device initiates data collection from the slave devices as described below.

Collective message comprises an acknowledgement message sent by a slave communication device to a network in response to receiving the initiation message. The collective message sent by individual devices in a dedicated time slot contains data from the device and data collected since the beginning of the acknowledgement frame from other devices.

Collection comprises structured data accumulation by merging.

A frame in communication systems utilising TDMA comprises a periodically repeating block of data consisting of a fixed number of dedicated time slots, one for each communication device operating in a network. During a frame, the individual devices in wireless networks periodically forward a packet containing data in dedicated time slots.

An initiation message frame comprises a periodically forwarded packet containing an initiation message.

An acknowledgement frame comprises periodically forwarded packets containing a collective message. Forwarding comprises reception and subsequent sending.

Figure 1A:
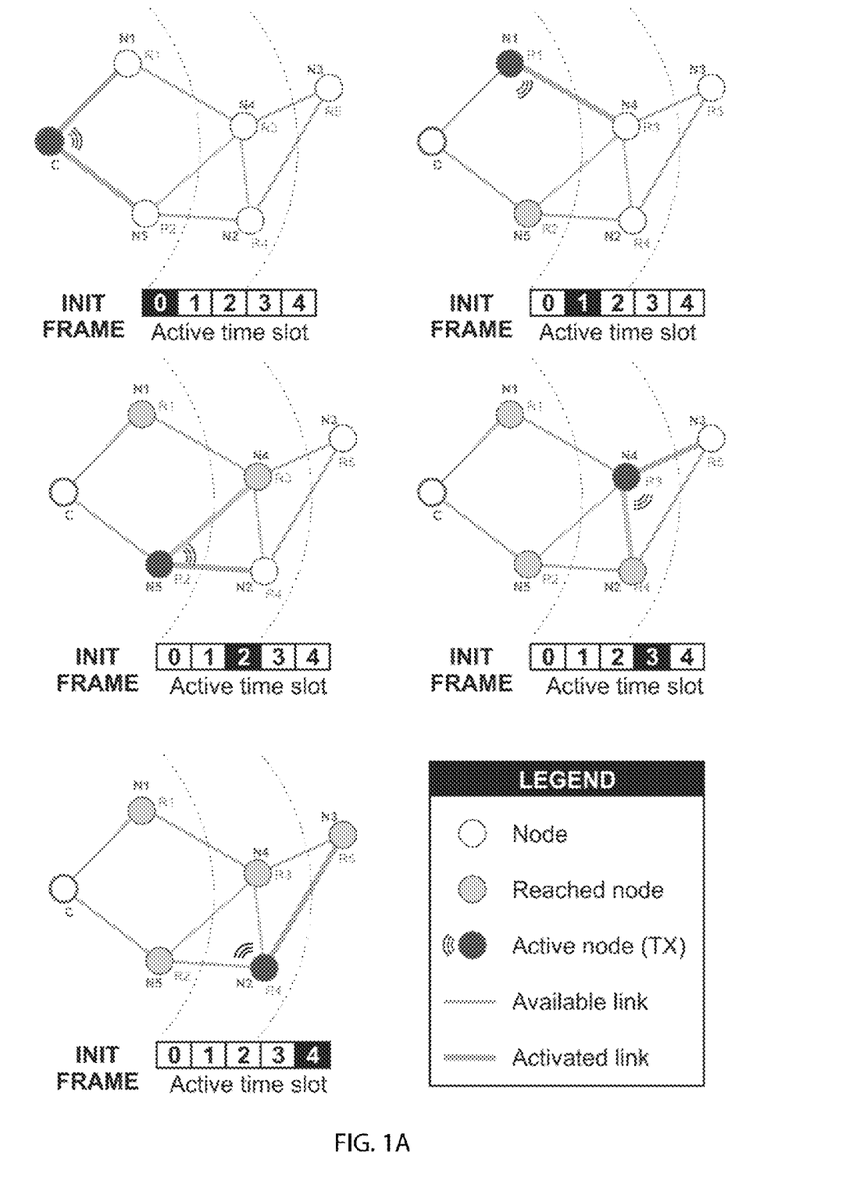
FIGS. 1A and 1B show a system of routing and gradual sending of a collective message.
Figure 1B:
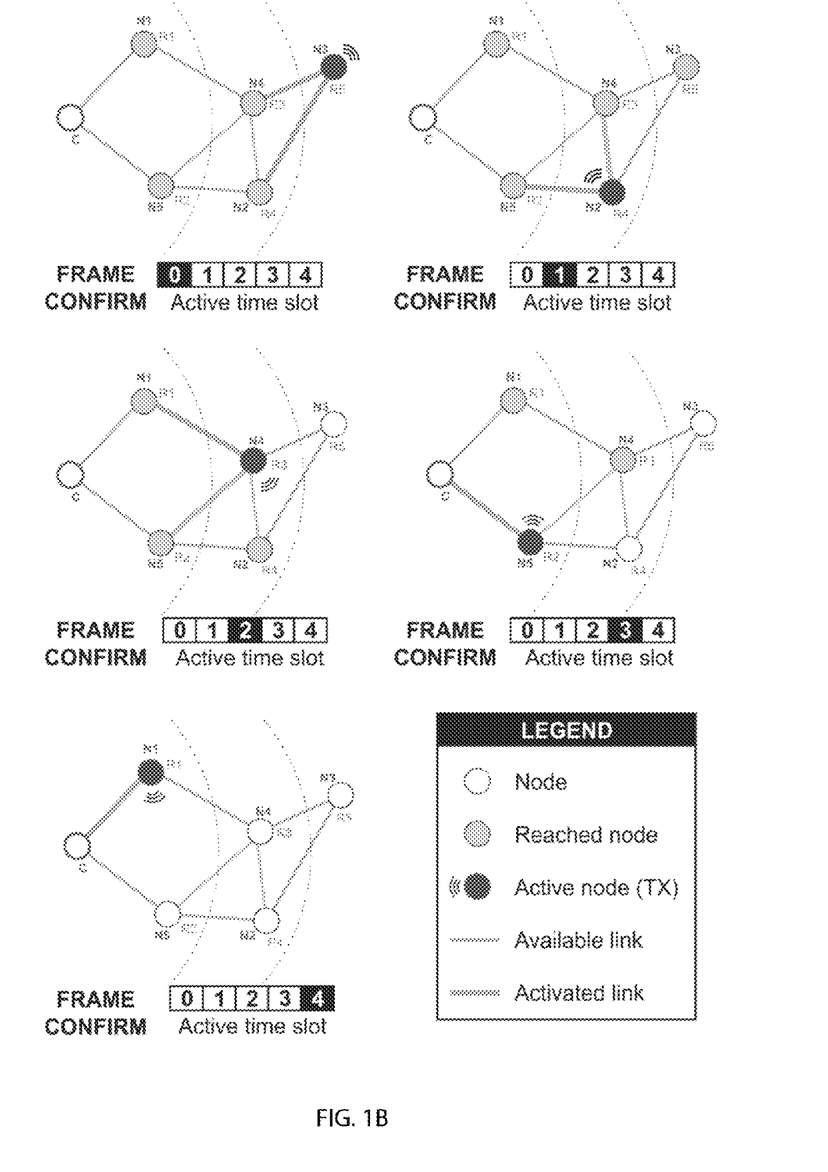

FIGS. 1A and 1B show a system of routing and gradual sending of a collective message. The system provides bulk responses from slave network communication devices N and bulk collection of data with packet transmission in wireless mesh networks, based on deployment of a created virtual routing structure. The individual slave communication devices of the network—communication devices N (with addresses N1 to N5)—have a unique virtual routing number VRN assigned by the control communication device C, which represents their distance from the control communication device C in the network based on the number of routings. The network is arranged in this way for transmission of control packets from the control device of the network (controlling communication devices C) to addressed slave communication devices N and back using directional flooding. Each discovered slave communication device N (with addresses N1 to N5) is assigned a unique virtual routing number VRN, specifically R1 to R5. After reception of the initiation message, time-synchronised relative to the beginning of the frame, individual addressed slave network communication devices N first perform a required sequence of instructions in response to interpretation of the additional information inserted into the initiation message by the control communication device C. The individual addressed slave network communication devices N independently, or based on the interpretation result, set one or several bits. These bits are inserted into the collective acknowledgement message addressed to the control communication (network) device C.

The system processing of bulk response messages from network slave communication devices N is based on deploying of an already created virtual routing structure in combination with a TDMA method (multiple access with time division), together ensuring efficient flooding of the network. The time slot when each network slave communication device N is active, i.e. when it may perform routing and confirm receipt of message packets, is related to the VRN assigned to that slave communication device N. The system arranges the virtual routing structure according to unique virtual routing numbers VRN assigned by the control communication device C during searching through the network based on slave device distance from the control communication device C. This VRN arrangement enables progressive delivery of the initiation message sent by the control communication device C to all or a group of addressed slave communication devices N using routing employing directional flooding from the control communication device C. Further, the VRN arrangement supports wireless mesh network sending acknowledgement collective messages by the network slave communication devices N from the highest virtual routing number VRN towards the network control communication device C. The system merges an acknowledgement message with previously received collective messages gradually accumulating data inserted by the individual slave communication devices N, and ensuring delivery of inserted data to the control communication device C.

The system is advantageously deployed either for processing bulk responses from the individual slave communication devices N, or for bulk data collection from these devices. Each network slave communication device N addressed by the initiation message, forwards the received initiation message in its respective time slot of a frame, and subsequently, based on additional information in the initiation message, progressively receives the acknowledgement messages sent by the network slave communication devices N with higher virtual routing number VRN. Each network slave communication device N merges and stores acknowledgement messages for further sending in the respective time frame of the acknowledgement frame.

In one embodiment, the system of bulk data and response collection from network slave communication devices N comprises a directly addressable service in a wireless network for bulk synchronised reception of responses and data collection from network devices. In response to reception of the initiation message, time-synchronised relative to the beginning of the frame, individual addressed slave network communication devices N interpret the initiation message as a command for a virtual peripheral (service) providing additional information. An individual addressed slave network communication device performs the required sequence of instructions and independently or based on result of the performance, sets one or several bits. The set bits are inserted by the device into the collective acknowledgement message addressed to the control network communication device C. The system thereby provides a virtual peripheral for network services and may be used, e.g. for data collection or for network management, thus substantially enhancing function and creating a generic platform with the individual addressed slave network communication devices.

FIGS. 1A and 1B show exemplary operation of data collection of a single byte indicating a device number. Specifically, FIGS. 1A and 1B illustrate a method of routing (VRN numbers marked as R1, R2, R3, R4 and R5). The Table of FIG. 3 records the progressive status of data collection from individual network slave communication devices N and data merging. The system advantageously maintains backward compatibility of interpretation of sent messages and supports older versions of IQRF OS (Intelligent Connectivity using Radio Frequency Operating System). In an embodiment the system is implemented in a TR-52D transceiver module, having circuit and layout as illustrated in simplified form in FIG. 2.

General structure of a message sent by an individual addressed slave network communication device:

| PIN | DLEN | CRCH | [NTW INFO] | [CRCN] | DATA | CRCD | CRCS |
|-----|------|------|------------|--------|------|------|------|

Individual parts of the message contain information about the message, its destination and also the data itself. The PIN (Packet INfo) part contains control information about the packet, DLEN (Data LENgth) contains information about the length of the data stored in the DATA part, CRCH/CRCD/CRCS are used to check the consistency of the message and its parts.

Structure of NTW INFO for network packets:

| RX | TX | NID0 | NID1 | PID | [RTVRN] | [RTDEF] | [RTDT0] | [RTDT1] | [RTDT2] | [RTDT3] | ... |
|----|----|------|------|-----|---------|---------|---------|---------|---------|---------|-----|
| ... | [MPRW0] | [MPRW1] | [MPRW2] | [CRYPT0] | [CRYPT1] | [AUX0] | [AUX1] | | | | |

In order to maintain backward compatibility with lower versions of the IQRF OS operating system, the structure of the message is kept. The respective extension has been inserted into the part of the message used for routing, while the device with number 0xFF (RX=0xFF) is specified as a recipient, which denotes a bulk message addressed to substantially all devices in the network in current and previous versions of the IQRF OS operating system. For this purpose, bit ACKF in the control byte PIN is set, which means that acknowledgement of individual devices is required. Bytes MPRW0, MPRW1, MPRW2 are used for direct addressing of peripherals and services in wireless networks, and are used for further additional and control data, e.g. for timing of an acknowledgement message. The highest data bit from individual network slave communication devices N is reserved for validation of data of the network device, and it is used for subsequent merging of repeatedly received data as apparent from Table 1 (FIG. 3) using a logical function OR.

Figure 2:
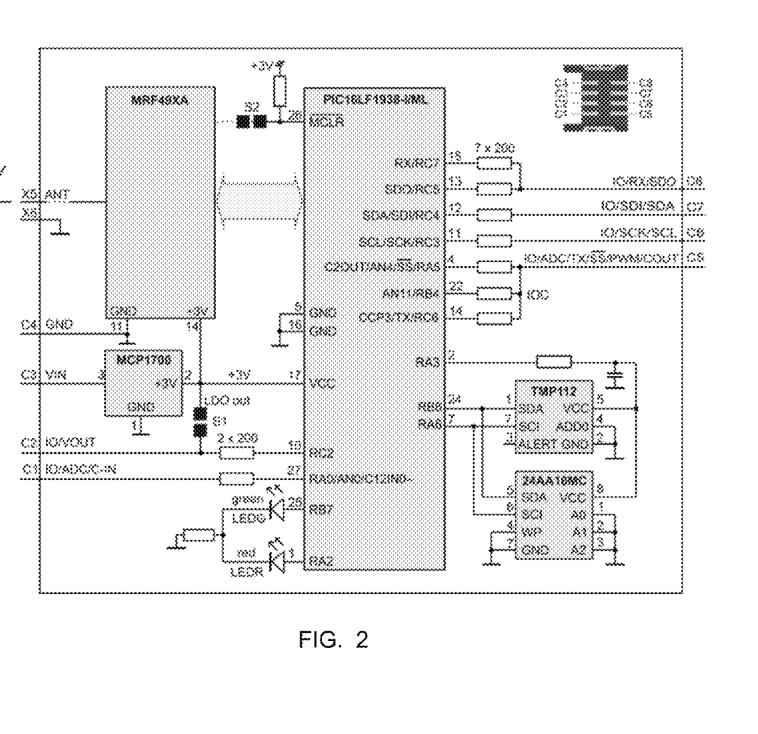
FIG. 2 shows an embodiment where the system is implemented into a TR-52D transceiver module and structural arrangement.

FIG. 2 shows a processor with internal memory used by a slave communication device for operation within a wireless mesh network of communication devices including a control communication device. The memory stores a virtual routing identifier assigned to the slave communication device in response to increasing range from the control communication device. The processor, in response to receiving an initiation message from a control communication device, initiates data collection from the slave communication device synchronised relative to the start of the initiation message frame by, cumulatively setting bits in a first acknowledgement message in response to content of a second acknowledgement message received from another slave communication device. The first acknowledgement message being synchronized with start of the initiation message frame and the processor initiates communication of the first acknowledgement message to a destination in a time slot selected in response to the assigned virtual routing identifier.

The processor accumulates data from multiple slave communication devices in time slots of acknowledgement messages and cumulatively sets bits in the first acknowledgement message in response to data derived from operation of the slave communication device as well as accumulated data from the multiple slave communication devices. Further, in one embodiment, the initiation message initiates data collection, from the multiple slave communication devices in return messages, by the control communication device using directional flooding. The processor iteratively accumulates data from a plurality of slave communication devices in time slots of multiple acknowledgement messages and cumulatively sets bits in the first acknowledgement message in response to the accumulated data.

The processor executes a sequence of instructions determined in response to data content of the initiation message from the control communication device. The processor also determines timing of communicating the first acknowledgement message in response to data content of the initiation message from the control communication device. Also, the processor adaptively changes data collected and communicated by the slave communication device in response to at least one of, (a) the initiation message from the control communication device and (b) a message received from another slave communication device.

Figure 3:
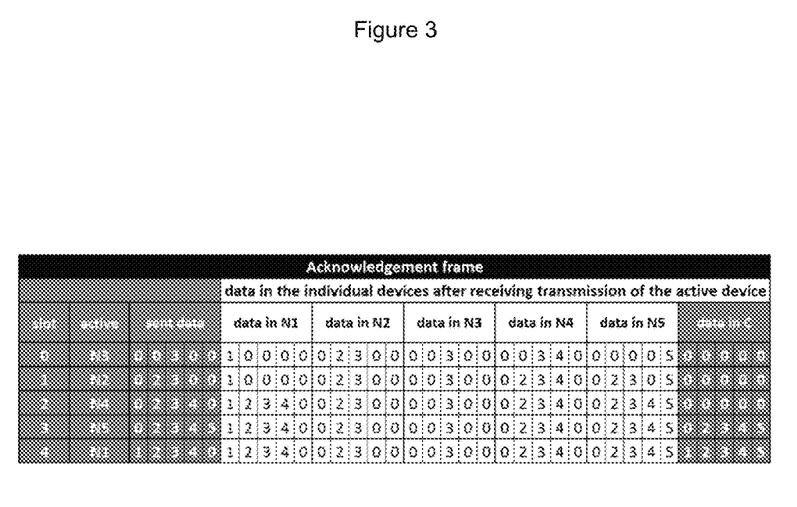
FIG. 3 shows an acknowledgement frame Table indicating gradual status of data collection and merging of data in nodes N1-N5 using time slots 0-4.

FIGS. 1A and 1B show a system of routing and gradual sending of a collective message. FIG. 3 shows an acknowledgement frame Table indicating gradual status of data collection and merging of data in nodes N1-N5 using time slots 0-4. FIG. 1B in conjunction with the Table of FIG. 3 shows sending and collection of message data from node N3 to N2 to N4 to N5 to N1 illustrating accumulation of data 00300 node N3, 02300 node N2, 02340 node N4, 02345 to 12340 node N1 data. FIG. 1A shows a similar operation and is not described to avoid repetition. An individual node (N1-N5) can forward its own data and data it has already received during previous time slots. The FIG. 3 Table shows, for example, data collected by node N1 between time slots 0-3 data is from N1 to N4, and it can forward this data (already received in previous time slots). This conforms with routing shown in FIG. 1B, based on the topology and routing numbers. An individual row of the FIG. 3 Table shows what is happing at each time slot on each node N.

In an embodiment, a TR-52D transceiver module implements the system with minimal hardware requirements using less than 1 kbytes of program memory of a PIC16F1938 microcontroller. The system improves communication in wireless networks, ensures more efficient management of wireless networks and accelerates data collection in telemetric networks, large sensor networks or systems of automated data reading.

What is claimed is:

1. In a wireless mesh network of communication devices using packet message transmission including a plurality of slave communication devices and at least one control communication device, a slave communication device comprising:
    a memory storing a virtual routing identifier assigned to said slave communication device in response to increasing range from a control communication device, said virtual routing identifier establishing a time slot during a message frame when the slave communication device is active; and
    a processor configured to, in response to receiving an initiation message from said control communication device, initiate data collection from said slave communication device synchronised relative to a start of an initiation message frame by,
    cumulatively setting bits in a first acknowledgement message in response to content of a second acknowledgement message received from another slave communication device of said plurality of slave communication devices in an acknowledgement frame that is time-synchronised to the initiation message frame, said first acknowledgement message being synchronized with start of said initiation message frame and
    initiating communication of said first acknowledgement message to a destination in a time slot selected in response to the assigned virtual routing identifier.

2. The slave communication device according to claim 1, wherein
    said processor accumulates data from the plurality of slave communication devices in time slots of acknowledgement messages and
    cumulatively sets bits in said first acknowledgement message in response to the accumulated data.

3. The slave communication device according to claim 2, wherein
    said processor cumulatively sets bits in said first acknowledgement message in response to data derived from operation of said slave communication device as well as accumulated data from said plurality of slave communication devices.

4. The slave communication device according to claim 1, wherein
    said initiation message initiates data collection from said plurality of slave communication devices.

5. The slave communication device according to claim 1, wherein
    said initiation message initiates data collection, from said plurality of slave communication devices in return messages, by said control communication device using directional flooding.

6. The slave communication device according to claim 1, wherein
    said processor iteratively accumulates data from the plurality of slave communication devices in time slots of a plurality of acknowledgement messages and
    cumulatively sets bits in said first acknowledgement message in response to the accumulated data.

7. The slave communication device according to claim 1, wherein
    said processor executes a sequence of instructions determined in response to data content of said initiation message from the control communication device.

8. The slave communication device according to claim 1, wherein
    said processor determines timing of communicating said first acknowledgement message in response to data content of said initiation message from the control communication device.

9. The slave communication device according to claim 1, wherein
    said processor adaptively changes data collected and communicated by said slave communication device in response to at least one of, (a) said initiation message from the control communication device and (b) a message received from another slave communication device.

10. A method employed by a slave communication device in a wireless mesh network of communication devices using packet message transmission including a plurality of slave communication devices and at least one control communication device, comprising the activities of:
    storing in a memory, a virtual routing identifier assigned to said slave communication device in response to increasing range from a control communication device, said virtual routing identifier establishing a time slot during a message frame when the slave communication device is active; and
    in response to receiving an initiation message from said control communication device, initiating data collection from said slave communication device synchronised relative to a start of an initiation message frame by,
    cumulatively setting bits in a first acknowledgement message in response to content of a second acknowledgement message received from another slave communication device of said plurality of slave communication devices in an acknowledgement frame that is time-synchronised to the initiation message frame, said first acknowledgement message being synchronized with start of said initiation message frame and initiating communication of said first acknowledgement message to a destination in a time slot selected in response to the assigned virtual routing identifier.

11. The method according to claim 10, including
accumulating data from the plurality of slave communication devices in time slots of acknowledgement messages and
cumulatively setting bits in said first acknowledgement message in response to the accumulated data.

12. The method according to claim 11, including
cumulatively setting bits in said first acknowledgement message in response to, data derived from operation of said slave communication device as well as accumulated data from said plurality of slave communication devices.

13. The method according to claim 10, including
iteratively accumulating data from the plurality of slave communication devices in time slots of a plurality of acknowledgement messages and
cumulatively sets bits in said first acknowledgement message in response to the accumulated data.

14. The method according to claim 10, including
executing a sequence of instructions determined in response to data content of said initiation message from the control communication device.

15. The method according to claim 10, wherein
determining timing of communicating said first acknowledgement message in response to data content of said initiation message from the control communication device.

16. The method according to claim 10, including
adaptively changing data collected and communicated by said slave communication device in response to at least one of, (a) said initiation message from the control communication device and (b) a message received from another slave communication device.

17. A method of message acknowledgement or data collection from communication devices with packet transmission of messages in a wireless mesh network including at least one control communication device and a set of slave communication devices, the method comprising:
the control communication device searching through the mesh network so that a unique virtual routing number for the network is assigned to each found slave communication device and stored into a memory of the control communication device, said virtual routing number establishing a time slot during a message frame when the slave communication device is active, and
in the network, transmitting control messages from the control communication device to the set of slave communication devices and back through directional flooding by, in addressed slave communication devices after reception of an initiation message from the control communication device through which the control communication device initiates data collection from slave communication devices that are time-synchronised relative to the beginning of an initiation frame, setting bits at a plurality of the addressed slave communication devices, and merging acknowledgement collective messages received from other addressed slave communication devices during an acknowledgement frame that is time-synchronised to the initiation frame, wherein merged acknowledgement collective messages are gradually sent by the slave communication devices in a corresponding time slot of the acknowledgement frame from a highest virtual routing number towards the control communication device.

18. The method according to claim 17, wherein the initiation message from the control communication device, routed to slave communication devices, includes additional information inserted, and in the addressed slave communication devices the additional information is interpreted and a required sequence of instructions is performed based on the interpretation to set bits, which bits are then inserted into the collective acknowledgement message addressed to the control communication device.

19. The method according to claim 17, wherein a timing of the acknowledgement frame is performed depending on an additional information inserted into the initiation message from the control communication device.

20. The method according to claim 17, wherein each slave communication device is a directly addressable virtual peripheral in the wireless mesh network.

* * * * *